May 7, 1968 P. RETZ 3,381,680

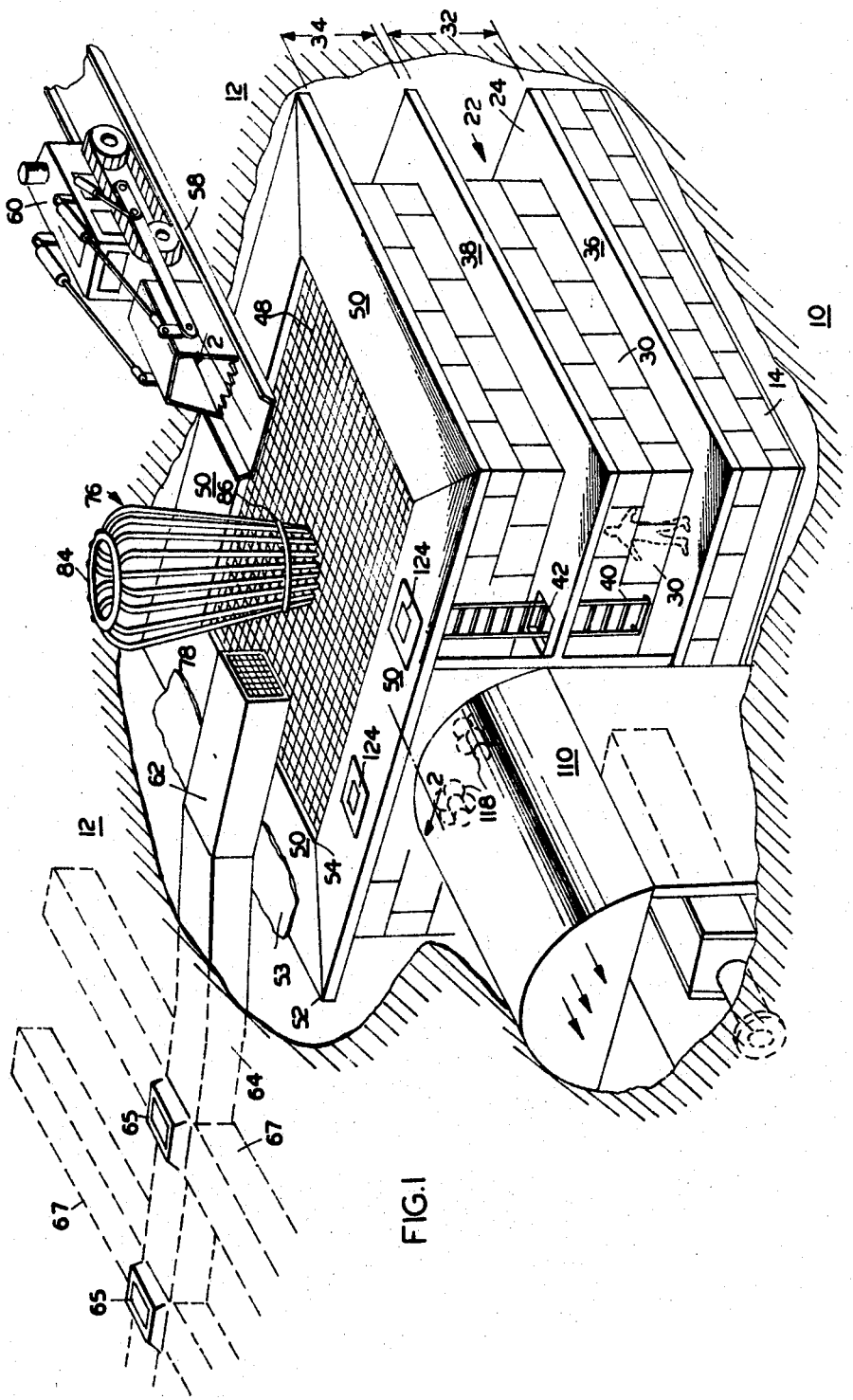

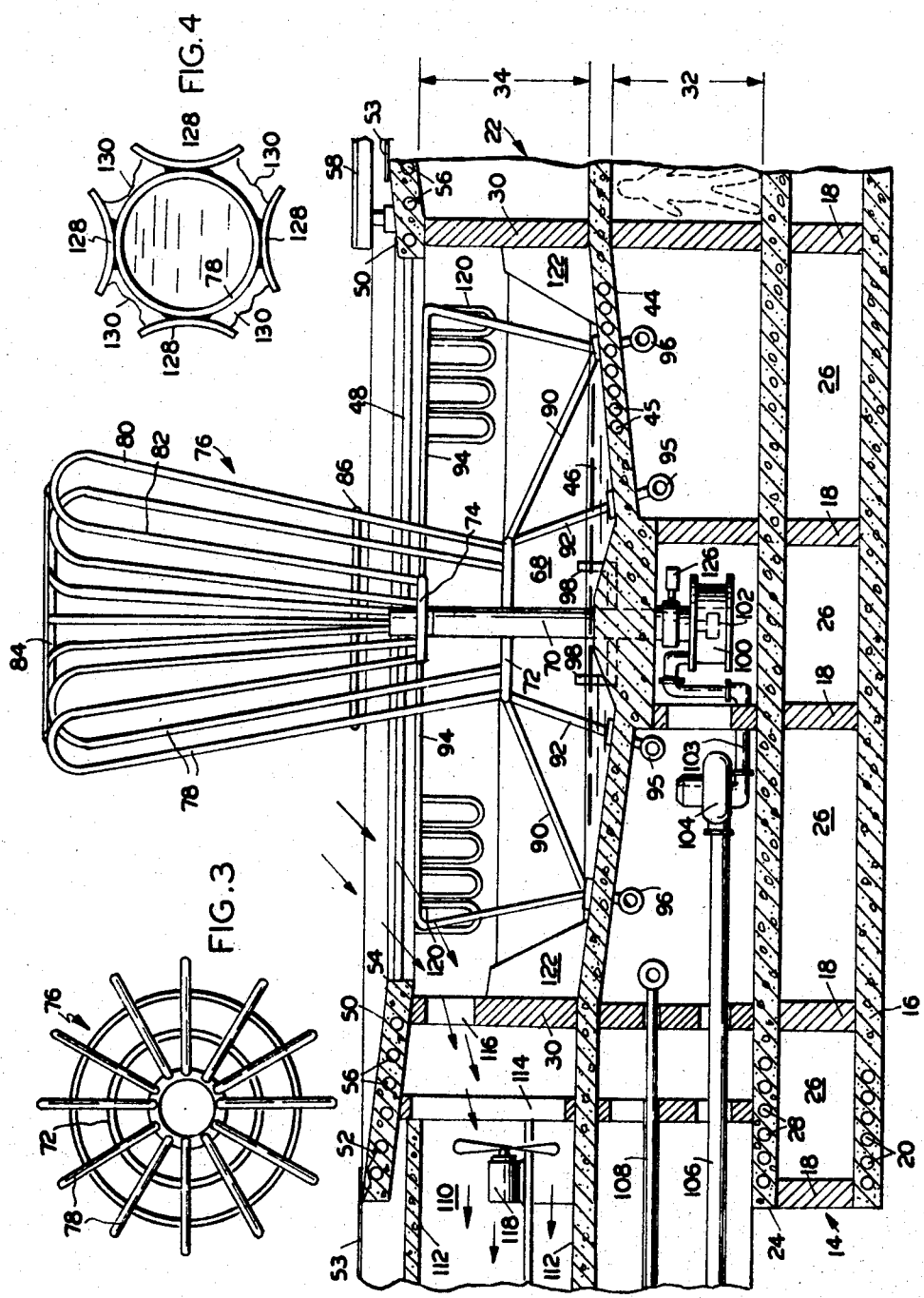

SNOW MELTING SYSTEM

Filed Oct. 22, 1965 3 Sheets-Sheet 3

United States Patent Office 3,381,680
Patented May 7, 1968

3,381,680
SNOW MELTING SYSTEM
Philip Retz, 1783 Lanier Place NW.,
Washington, D.C. 20009
Filed Oct. 22, 1965, Ser. No. 502,023
3 Claims. (Cl. 126—343.5)

ABSTRACT OF THE DISCLOSURE

This invention relates to a system for harvesting snow by delivering or catching the snow at a specified collection zone and melting the collected snow under sanitary conditions so as to produce a supply of clean water.

---

To collect water on an Arctic or Antarctic ice cap would seem to be easy—just go get some snow and melt it—but when there is an ice cap settlement of several hundred personnel, tons of water will be required to satisfy all their needs. If there is work to be done, much more water will be needed. Thus a method of harvesting water from snow must be devised.

Whenever extensive work is to be done in the polar regions, it is necessary to provide adequate water facilities. The interest in the polar regions has now increased to the extent that the present methods of obtaining water in these regions is becoming inadequate. Of course, along with providing means for producing sufficient quantities of water in polar regions, it is also necessary to provide housing or building structures which among other things could be used for containing such water producing facilities. The construction of such buildings or housing structures are described in my Patent 3,153,912. Although it has been stated that the present invention has been described for use in the polar regions, it is possible to also use the invention in any very heavily snow-laden area and transporting resulting water to areas where it is needed.

Therefore, it is an object of the present invention to overcome the disadvantages of the present methods used for providing a water supply in the polar regions. It is another object of the present invention to provide a new and improved snow melting system. It is a further object of the present invention to provide a snow melting system for use in the polar regions. Yet another object of the present invention is to provide a snow melting system for use in any very heavily snow-laden area and deliver water to areas where water is a necessity.

It is still another object of the present invention to provide a snow melting system which can be used in the polar regions for supplying a large number of people with an adequate supply of water. Yet another object of the present invention is to provide apparatus for melting large quantities of snow for use as water in a relatively short period of time.

The above objects and others are accomplished by providing a snow melting system for use in snow-laden areas, which comprises a foundation laid below the surface of the snow and a housing structure upon the foundation. The housing structure lies entirely beneath the surface of the snow and includes a water collecting reservoir within the housing structure and snow collecting means located adjacent the top of the housing structure substantially level with the surface of the snow. The snow collecting means communicates with the water collecting reservoir and also provided within the housing is a snow melting means which projects through the snow collecting means above the surface level of the snow, these means being provided for catching and melting snow blown by winds. These and other objects and advantages will become more apparent after reading the following description taken in conjunction with the attached drawing, wherein:

FIGURE 1 is an isometric view of a snow melting system in accordance with this invention;

FIGURE 2 is a cross-sectional view taken across the lines 2—2 shown in FIGURE 1;

FIGURE 3 is a top view of the melting trellis of this invention with member 84 removed;

FIGURE 4 is a cross-sectional view of one of the pipe components of the melting trellis shown in FIGURES 1–3.

Figure 5:
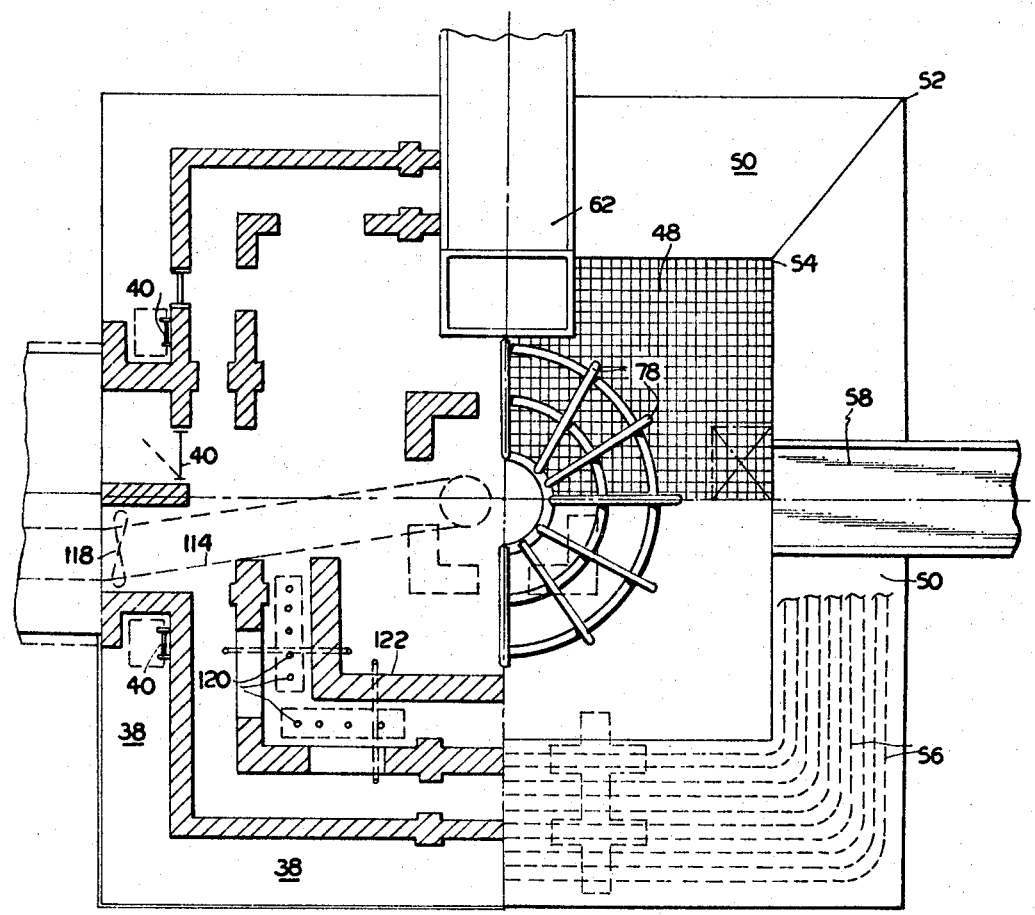
FIGURE 5 is another partial section of a top view of FIGURE 1.

Considered from one aspect, the snow melting system of the present invention involves:

(a) A foundation laid below the surface of snow;

(b) A housing structure upon said foundation and entirely beneath the surface of the snow;

(c) A water collecting reservoir within said housing structure;

(d) Snow collecting means situated adjacent the top of said housing structure and substantially level with the surface of the snow;

(e) Said snow collecting means communicating with said water collecting reservoir, and (f) Snow melting means mounted within said housing structure and projecting through said snow collecting means above the surface level of the snow, for catching and melting snow blown by winds.

It is believed that the invention will now be understood in specific terms by referring to the various figures.

FIGURE 1 shows a snow melting system of the present invention generally designated as 10, the greater part of which lies below the surface of the snow indicated as 12. The snow melting system as contemplated by this invention lies substantially below the surface of snow and in the preferred embodiment extends to a depth of about 20 feet. At the very bottom of the snow melting system 10 is a foundation indicated at 14 made of construction blocks. As shown more clearly in FIGURE 2, the foundation 14 includes the bottom wall 16 which has vertical supporting members 18 formed at spaced intervals therealong. Embedded at points along the floor wall 16 are pipes 20 through which a hot non-freezable liquid (water, alcohol, etc.) is made to flow in order to provide heating of the floor wall 16. For a more detailed description of a preferred foundation see my Patent 3,153,912 entitled "Construction Under Low Temperature Conditions."

As shown in FIGURES 1 and 2, mounted above the foundation 14 is a housing structure designated generally as 22. The housing structure 22 has a floor 24 of concrete which rests upon the vertical members 18 of the foundation 14. Between the floor 24 and the bottom wall 16 are crawl spaces 26. Also embedded in the floor 24 are pipes 28 through which hot water is made to flow in order to keep the floor 24 heated. The housing structure 22 has four side walls 30, two of which are shown in FIGURE 1, and has two levels 32 and 34 respectively, level 34 lying above level 32. Both levels 32 and 34 have a balcony associated therewith and these balconies are designated in FIGURE 1 as 36 and 38 respectively. Balconies 36 and 38 surround the housing structure on all four sides and allow one operating or working in the system to inspect the outside of housing structure 22. Housing structure 22, which is a part of the foundation 14, lies entirely beneath the surface of the snow 12. Situated against one wall 30 of the housing structure 22 are one or more ladders which can be used by personnel in going from level 32 to level 34, such movement being facilitated by an opening 42 in the balcony 38.

Within the housing structure 22 is a water collecting reservoir 44 which is generally concave in shape so as to hold water which is designated as 46. The water collecting reservoir 44 is shown in FIGURE 2 but cannot be seen in FIGURE 1. The water collecting reservoir 44 begins at about the level of the balcony 38 and has a slight concavity running inward from the walls of the housing structure 22.

Spaced directly above the water collecting reservoir 44 is a grate 48 which substantially covers the top of housing structure 22. Surrounding grating 48 is an apron 50 which surrounds the grating 48 on all four sides. The apron 50 has a slight incline thereto extending from its outer edge 52 down to the point 54 where it meets the grating 48. This incline allows the water and snow which collects on the apron 50 to run down into the grating 48. The grating 48 communicates with the water collecting reservoir 44 so as to allow any snow or water which pass over the grating 48 to drop into the water collecting reservoir 44. Embedded in the apron 50 are pipes 56 as indicated in FIGURES 4 and 5 through which heated water (or other heated liquid) is passed so as to heat the apron and thereby melt any snow which comes to rest thereon. The uppermost point 52 of the apron 50 lies substantially level with the surface of the snow 12. Bridging the surface of the snow and the apron 50 is a fabric snow seal designated as 53. This fabric snow seal 53 borders all four sides of the apron 50 and prevents snow from collecting under the apron 50. Provided above and resting on the surface of the snow is a ramp 58 which extends out over the apron 50 and provides a supporting base upon which a tractor plow 60 (as indicated in FIGURE 1) may be moved in order to shovel snow onto the grating 48 when the wind is relatively still and it is necessary to so provide snow. Also provided is a conveyor outlet 62 which is shown in FIGURE 1 and which also preferably bridges over one portion of the apron 50 and extends partly onto the grating 48. The portion of the conveyor outlet 62 which rests on a portion of the apron 50 and on the grating 48 lies above the surface of the snow whereas the remaining portion of the conveyor (which is designated as 64) lies generally below the surface of the snow. The conveyor acts as another means for getting snow onto the grating 48 when the wind is relatively still. A tractor plow can be used in conjunction with conveyor 62 to transport snow onto the conveyor when the conveyor 62 moves the snow up onto the grating 48. The portion 64 of the conveyor is preferably embedded under the surface of the snow and has snow hoppers 65 at spaced intervals which communicate with the interior of the conveyor and the surface of the snow. Lying on either side of each snow hopper 65 are trenches 67 from which snow is dug with tractor plow. Once the snow is dug from the trenches 67, it is dumped into the hopper 65 through which it falls onto the conveyor. The snow is then conveyed onto the area where the melting takes place. This method of gathering the snow serves as a way of harvesting snow when the wind is relatively calm and is blowing no snow.

Mounted in the housing structure 22 is a snow melting means generally designated as 68 which includes a central pipe member 70. The central pipe 70 passes through the water collecting reservoir 44. Surrounding the central pipe 70 above the water collecting reservoir 44 is a supply ring 72 through which heated water is sent. Surrounding the central pipe 70 and spaced above the level of the supply ring 72 is a return 74 through which returned water flows. Supported by the central pipe 70 and the supply ring 72 and the return ring 74 is a melting trellis generally designated as 76 which consists of a plurality of U-shaped pipes 78 through which the heated liquid flows. The U-shaped pipes 78 have an outside portion 80 through which the water coming from the supply ring 72 flows and an inner portion 82 through which the water returns to the return ring 74. The outer portions 80 of each of the U-shaped pipe 78 are connected to the supply ring 72 while each of the inner portions 82 of the U-shaped pipe 78 is connected to the return ring 74. All the U-shaped pipes 78 are shown as being connected at their tops by a band member 84 and spaced at a distance downward therefrom and just above the grating 48 is another band 86 which both help support the U-shaped pipes 78. The return ring 74 is connected to the central pipe 70 by radial supporting means which are not shown. Ring 72 is partially supported by members 90. The heated water is supplied to the supply ring 72 through pipes 92 which originate below the water collecting reservoir 44 and extend up therethrough connecting with supply ring 72. Numerals 94 are employed to designate or represent a heated water supply which feeds the pipes 92 which lead to the supply ring 72. Connected radially to the return ring 74 are pipes 94 which have two purposes. One purpose is to provide support for the return ring 74 and the other is to pass the water from the return ring back to the returns generally designated as 96 which then are fed to a water heater, thus completing the cycle. Disposed around the central pipe 70 are water leveler pipes 98 which connect into the central pipe 70 below the surfaces of the water 46 in the water collecting reservoir 44 and extend up at their other ends to the level of the water 46 in the water collecting reservoir 44. As the water rises above the top of the water leveling pipes 98 the water will spill into these pipes and enter central pipe 70.

Thus, as can be seen from FIGURE 2 the complete cycling operation of the heated water through the melting trellis 76 is as follows. The water from heated water supplies 95 enters pipes 92 and travels up to supply ring 72. From supply ring 72 the water passes through the outer portions 80 of the U-shaped pipes 78 up and around and travels back down through the inner portions 82 of the U-shaped pipes 78. Returning through the inner portions 82 of the U-shaped pipes 78 the heated water reaches the return ring 74 from which it flows radially outwardly into the pipes 94, and whereafter it flows back to the returns 96. The water fed into the returns 96 is then returned to the hot water heater (not shown in FIGURE 4). This operation is a continuous cycle and the heated water continuously passes through the melting trellis 76.

Turning now to some of the other deails shown in FIGURE 2, the central pipe 70 at its lower portion leads into an observation tank 100 which allows an operator to view the water flowing from the central pipe 70 into the tank 100. As the water emanates from the central pipe 70 into the observation tank 100 it flows through a screen or filter 102 in order to filter out any particles which may have been in the water. Connected to the observation tank 100 by means of a pipe 103 is a water pump 104 which pumps the water out of the observation tank 100 as it collects and pumps it to a storage area (not shown) through pipe 106. Numeral 108 generally designates power lines which are brought into the housing structure 22 to operate the water pump and heated water supplies 94. Extending away from level 34 is a tunnel designated as 110 having walls 112. Tunnel 110 has an opening 114 which faces the wall 30 of the housing structure 22. In the wall 30 is an opening 116 which is adjacent the opening 114 leading into the tunnel 110. Tunnel 110 has a pair of fans 118 only one of which is shown in FIGURE 4. The purpose of the fans 118 is two-fold. One purpose is to allow cool air to blow down through tunnel 110 which is basically just cut out of the ice. By having the cool air sent through the tunnel 110 it minimizes the chance of a collapse of the walls 112 of the of the tunnel because of the melting snow or ice. Whereas walls 112 are indicated to be of concrete in order to simplify the drawings, concrete would probably not be used in such walls for any great distance because of the cost and difficulty of construction—and it is more probable that corrugated sheet metal would be used, thus increasing the dangers associated with melting snow. In addition, fan 118 by being situated adjacent opening 114 in the tunnel 110 and which is adjacent the opening 116 in the wall 30 of housing structure 22 draws air or creates a draft through those openings thus helping to draw snow which has collected above the grating 48 through into the area of the water collecting reservoir 44. Spaced below the surface of the grating 48 are heated snow grills 120 which help melt the snow as it is being drawn into the area of the water collecting reservoir 44 by means of the fans 118 as they draw air through the openings 116 and 114 back into the tunnel 110. Situated along the inside of walls 30 of the housing structure 22 and seated upon the outer edges of the water collecting reservoir 44 are freeze guards 122 which may be made out of foamed neoprene or similar resinous or plastic and acts to help contain the expansion of the water 46 if the system should ever break down and freeze. As this water freezes it will push upward and outward towards the wall 30 of the housing structure 22. These freeze guards will assist in containing the movement of the ice, and will allow sufficient time to repair the system and place it back in working order. Shown in FIGURE 1 are hatches 124 which are provided to allow the operators to get out of the housing structure to service the upper structure. Connected above the observation tank 100 is an automatic gate valve 126 which automatically controls the flow of water from the central pipes 70 which enters the observation tank 100.

FIGURE 4 shows a sectional view of one U-shaped pipe 78 which has an alternative configuration from those shown in FIGURES 1 and 4. As shown in FIGURE 1, 3 and 4, the pipes are conventional pipes. However, in FIGURE 4 a special type of pipe is shown which has a plurality of outer curved members 128 welded to the outside of pipe 78. The purpose of these curved members 128 is to provide spaces around the pipe 78 in which the snow may be caught and held against the pipe as the wind blows. By providing these spaces through which the snow collects the pipe 78 has the capability of catching and melting a greater volume of snow than with the ordinary pipe which has no such curved members 128 welded to the outer surface thereof.

FIGURE 3 shows a top view of the trellis 76 shown without the bands 84 and 86.

FIGURE 5 is a top sectional view of various levels of the system 10. The upper right hand quarter shows the upper portion showing the snow collecting means including apron 50 with its outermost and innermost points 52 and 54 respectively, grating 48, conveyor 62, ramp 58, and U-shaped pipes 78. The lower right hand quarter is a sectional view showing the pipes embedded in the apron 50. The upper left hand portion of FIGURE 5 merely shows the floor layout of the inner walls of the lower level 32 of the foundation of the housing structure 22. The lower left hand quarter shows the relationship of the fans 118, openings 114 and 116, the freeze guards 122, the balcony 38 and the air intake heated snow grills 120 which are associated with the operation of fans 118.

What is claimed is:

1. A snow melting system for use in heavily snow-laden areas which comprises:
   (a) a foundation laid below the surface of the snow;
   (b) a housing structure upon said foundation and entirely underneath the surface of the snow;
   (c) a water collecting reservoir within said housing structure;
   (d) snow collecting means situated adjacent the top of said housing structure substantially level with the surface of the snow;
   (e) said snow collecting means communicating with said water collecting reservoir; and
   (f) snow melting means mounted within said housing structure and projecting through said snow collecting means above the surface level of the snow for catching and melting snow blown by winds,
   (g) said snow collecting means includes a grating covering the top of said housing structure, an apron having heating pipes therein surrounding said grating and sloping upward therefrom, and conveyor means for bringing the snow up to the top of the housing structure when there are no winds.

2. A snow melting system for use in heavily snow-laden areas which comprises:
   (a) a foundation laid below the surface of the snow;
   (b) a housing structure upon said foundation and entirely underneath the surface of the snow;
   (c) a water collecting reservoir within said housing structure;
   (d) snow collecting means situated adjacent the top of said housing structure substantially level with the surface of the snow;
   (e) said snow collecting means communicating with said water collecting reservoir;
   (f) snow melting means mounted within said housing structure and projecting through said snow collecting means above the surface level of the snow for catching and melting snow blown by winds,
   (g) a central pipe extending through said water collecting reservoir;
   (h) a water supply ring surrounding and spaced from said central pipe supported by means situated adjacent the water collecting means;
   (i) a water return ring spaced from and surrounding said central pipe and above the water supply ring, said water return ring being supported by pipe members through which the water flows back to a return;
   (j) a plurality of U-shaped pipes each having an outer portion connected to said water supply ring and each having an inner portion connected to said water return ring; and
   (k) supply pipes extending through said water collecting reservoir and connected with said water supply ring, whereby water will flow through said supply pipes to said supply ring, through said U-shaped pipes to said water return rings and back to said return.

3. A snow melting system for use in heavily snow-laden areas which comprises:
   (a) a foundation laid below the surface of the snow;
   (b) a housing structure upon said foundation and entirely underneath the surface of the snow;
   (c) a water collecting reservoir within said housing structure;
   (d) snow collecting means situated adjacent the top of said housing structure substantially level with the surface of the snow;
   (e) said snow collecting means communicating with said water collecting reservoir;
   (f) snow melting means mounted within said housing structure and projecting through said snow collecting means above the surface level of the snow for catching and melting snow blown by winds, and
   (g) a fan arrangement mounted in the housing structure that serves to suck air and snow into the snow melting system.

References Cited

UNITED STATES PATENTS

| | | | |
|---|---|---|---|
| 942,337 | 12/1909 | Moore | 126—343.5 |
| 1,388,027 | 8/1921 | Connolly | 126—343.5 |
| 1,665,503 | 4/1928 | McClave et al. | 126—343.5 |
| 3,209,745 | 10/1965 | Glaser et al. | 126—360 X |
| 3,228,390 | 1/1966 | Johnston | 126—343.5 |

CHARLES J. MYHRE, *Primary Examiner.*